United States Patent Office 2,917,469
Patented Dec. 15, 1959

2,917,469

POLYMERS OF 3,4-EPOXYCYCLOHEXYLMETHYL 3,4-EPOXYCYCLOHEXANECARBOXYLATES

Benjamin Phillips, Charleston, and Frederick C. Frostick, Jr., Charles W. McGary, Jr., and Charles T. Patrick, Jr., South Charleston, W. Va., assignors to Union Carbide Corporation, a corporation of New York No Drawing. Application March 8, 1957
Serial No. 644,731

22 Claims. (Cl. 260—2)

This invention relates to curable compositions and resinous compositions made therefrom. More particularly, this invention is directed to novel amine-epoxide compositions which are useful in the synthetic resins art as adhesives, protective coatings, castings, laminates, films and the like, and to methods for their preparation. This application is a continuation-in-part of application Serial No. 586,933, filed May 24, 1956.

Epoxide resins have been made heretofore from mixtures of amines and polyglycidyl ethers of polyhydric phenols. These resins have achieved a degree of usefulness in the synthetic resins art but are limited by certain inherent characteristics to a restricted field of application. The viscosities of these mixtures are so high (of the order of 9,000 centipoises and higher at 25° C. without solvents or diluents) as to preclude easy handling and application. For example, in making castings from these mixtures extreme care and many times special equipment are required in order to obtain bubble-free castings. Although reactive diluents can be used, there are the disadvantages of higher cost and probable lower strength properties of resins made from these mixtures. The use of solvents is undesirable because of the likelihood of bubble formation in the resin when the solvent is driven off during curing and the dangers brought about by solvent fumes. It is also difficult to successfully incorporate fillers and pigments in these mixtures. Mixtures of amines and polyglycidyl ethers of polyhydric phenols have been found heretofore to have extremely short pot-lives. In some cases curing at room temperature takes place before a homogeneous mixture of amine and polyglycidyl ether can be obtained. This is particularly disadvantageous in that the period of time permissible for working and applying the mixture is very short and in some cases negligible. Non-uniform resins are obtained in such cases because of the inability to form homogeneous amine-epoxide mixtures prior to curing. Such mixtures are additionally disadvantageous in that, even when their pot-lives are sufficiently long to permit the attainment of homogeneity, they cannot be maintained in workable form for long periods. This entails the necessity of maintaining quantities of unmixed amine on hand which is accompanied by the dangers of the well-known toxicity and noxiousness associated with amines. The inconvenience of periodically preparing such amine-epoxide mixtures can be costly, time-consuming and dangerous.

Our curable compositions comprise mixtures of polyfunctional amines and 3,4-epoxycyclohexylmethyl 3,4-epoxycyclohexanecarboxylates, hereinafter to be referred to also as the diepoxide. By the term "polyfunctional amine," as used herein, is meant an amine having at least two active amino hydrogen atoms which can be on the same nitrogen or on different nitrogen atoms. Our compositions are mobile liquids having low viscosities (from 500 to 800 centipoises at 26° C.) and are particularly capable of being easily prepared and conveniently applied to form bubble-free resins. Various fillers and pigments can be readily incorporated into our compositions to provide variegated physical effects. They are storable for long periods of time, more than one week, without hardening or appreciable increases in viscosity. They can be rapidly cured by adding small amounts of acidic catalysts or by the application of heat without catalysts or by both measures. These curable compositions can also be partially cured to form solid, partially polymerized resins which can be pulverized or ground to make molding and casting compounds. Such casting and molding compounds can be stored without refrigeration for long periods of up to one year and longer after which time they can be molded or otherwise shaped and fully cured by the application of heat. The partially cured resin may also be dissolved in a suitable solvent, such as xylene or methylisobutyl ketone and used as surface coating which can be subsequently heat cured.

The resins of this invention are solvent-resistant, abrasion-resistant, tough products. They can be made as transparent products or can be colored with suitable pigments and as uniform, infusible products free of bubbles or other discontinuities. These resins can be also made with a wide range of flexibilities and rigidities. Products having properties which are tailor-made for specific requirements of flexibility and rigidity can thus be produced. Our resins adhere tenaciously to many materials and exhibit only negligible shrinkage during their formation by curing. Such resins are useful in many applications including the manufacture of various articles, such as door knobs, brush handles, small structural parts for instrument cabinets and electronic components for use in guided missiles and high speed aircraft, and as protective coatings for many materials, such as wood, glass and metal.

Our curable compositions can be readily prepared by mixing a polyfunctional amine with a 3,4-epoxycyclohexylmethyl 3,4-epoxycyclohexanecarboxylate and treating, as by stirring to obtain a homogeneous mixture or solution. When a solid or highly viscous amine is employed heating is advantageous in facilitating the formation of a solution. In any event the application of heat may be used to aid in bringing about solution, although it should not be prolonged to the extent that substantial curing takes place. Acid catalysts can be added at this point or at any point prior to curing or not at all, as desired. Catalyst concentrations can be varied over a wide range depending upon the rate of cure desired. Concentrations of up to 10 weight percent based on the weight of diepoxide have been found to be advantageous. Catalyst concentrations as low as 0.05 weight percent based on the weight of diepoxide have been found to provide appreciable catalytic effects.

Our resins can be prepared from these curable compositions by the application of heat. The curing can be carried out by maintaining the curable compositions at temperatures in the range from 30° C. to 250° C. Temperatures higher than 250° C. can be used although some discoloration which may not be desired may be brought about in the resins thus formed. The time for effecting the complete cure can be made to vary from several minutes to several hours depending upon the selection of curing temperatures. A higher curing temperature will provide a resin in less time than a low curing temperature. It is preferred, however, to heat the curable compositions at a temperature within the range from 50° C. to 150° C. to first partially cure the composition. A temperature from 100° C. to 200° C. then can be used to complete the cure. However, any one or combination of two or more temperatures within the above-specified range of 30° C. to 250° C. can be employed, if desired, to effect the full cure.

While not wishing to be held to any particular theory or mechanics of reaction, it is believed that in curing, one epoxy group of the diepoxide molecule reacts with a maximum of one amino hydrogen of the polyfunctional amine molecule with the formation of a hydroxyl group attached to the diepoxide molecule and a carbon to nitrogen to carbon linkage interconnecting the amine and diepoxide molecules. Thus, according to this belief, a polyfunctional amine having more than 2 amino hydrogens to the molecule would cross-link through carbon to nitrogen to carbon linkages. Also according to our observations a degree of etherification occurs from intermolecular reactions of two or more epoxy groups with each other and from intermolecular reactions of an epoxy group with a hydroxyl group formed in the above-noted manner by a previous reaction of an epoxy group with an amino hydrogen. Thus, additional cross-linking through carbon to oxygen to carbon linkages is thought to be effected by these intermolecular reactions between epoxy groups or epoxy groups and hydroxyl groups.

Tough, solid resins have been obtained by curing our curable compositions which contain such relative proportions of polyfunctional amine and 3,4-epoxycyclohexylmethyl 3,4-epoxycyclohexanecarboxylate as provide from 0.2 to 5.0 amino hydrogens of the amine for each epoxy group from the diepoxide. Hard, tough, infusion resins have been obtained from our curable compositions containing such relative amounts of polyfunctional amine and 3,4-epoxycyclohexylmethyl 3,4-epoxycyclohexanecarboxylate as provide from 0.8 to 2.0 amino hydrogens of the amine for each epoxy group of the diepoxide. Resins produced from our curable compositions containing 1 to 3 amino hydrogens per epoxy group have been found to be useful as anion exchange resins. Hardenable epoxide resins can be obtained from our curable compositions, for example, those containing less than 0.4 amino hydrogen per epoxy group. Such hardenable resins can be polymerized with active hydrogen compounds, e.g., polyamines, polyhydric alcohols or phenols, polycarboxylic acids and the like or polycarboxylic anhydrides to form useful products or they can be used as plasticizers and/or stabilizers for chlorine-containing resins. Epoxide resinous hardeners can also be made from our curable compositions, particularly those containing more than 4.0 amino hydrogens per epoxy group. These resinous hardeners can be used to harden the many polyepoxides to produce useful products. Resins having different physical properties can be produced by curing our compositions which contain amounts of amine and diepoxide providing different ratios of amino hydrogens to epoxy groups.

The 3,4-epoxycyclohexylmethyl 3,4-epoxycyclohexanecarboxylates which are a part of our curable compositions are the monoesters of 3,4-epoxycyclohexylmethanols and 3,4-epoxycyclohexanecarboxylic acids. Illustrative of some 3,4-epoxycyclohexylmethyl 3,4-epoxycyclohexanecarboxylates are 3,4-epoxy-1-methylcyclohexylmethyl 3,4-epoxy - 1 - methylcyclohexanecarboxylate, 3,4-epoxy-2-methylcyclohexylmethyl 3,4-epoxy-2-methylcyclohexanecarboxylate, 3,4 - epoxy - 3-methylcyclohexylmethyl 3,4-epoxy - 3 - methylcyclohexanecarboxylate, 3,4 - epoxy-4-methylcyclohexylmethyl 3,4-epoxy-4-methylcyclohexanecarboxylate, 3,4 - epoxy - 5-methylcyclohexylmethyl 3,4-epoxy-5-methylcyclohexanecarboxylate, 3,4-epoxy-6-methylcyclohexylmethyl 3,4 - epoxy-6-methylcyclohexanecarboxylate, 3,4-epoxy-2,2,5,5,6-pentamethylcyclohexylmethyl 3,4 - epoxy-2,2,5,5,6-pentamethylcyclohexanecarboxylate, and the like. Preferred polyepoxides are 3,4-epoxycyclohexylmethyl 3,4-epoxycyclohexanecarboxylate and lower alkyl ring substituted 3,4-epoxyclcyohexylmethyl 3,4-epoxycyclohexanecarboxylates having no more than 5 alkyl groups attached to a single cyclohexane ring. By the term "lower alkyl," as used herein, is meant alkyl groups having from 1 to 6 carbon atoms.

These polyepoxides can be prepared by any suitable method. They can be advantageously prepared by epoxidizing corresponding 3-cyclohexenylmethyl 3-cyclohexenecarboxylates with suitable epoxidizing agents. Methods for making these polyepoxides are described in U.S. Patent No. 2,716,123.

Polyfunctional amines are typified by the aliphatic primary amines, such as, ethylamine, isopropylamine, n-butylamine, isobutylamine, 2-ethylhexylamine, monoethanolamine, monoisopropanolamine, beta alanine, amides, e.g., formamide, acetamide, propionamide, n-butyramide, stearamides, hexahydrobenzamide, and the like; aromatic primary amines, such as, aniline, para-methylbenzylamine, and the like; heterocyclic primary amines, such as, N-(aminoethyl) morpholine, N-(aminopropyl) morpholine, and the like, the aliphatic polyamines, such as, ethylenediamine, propylenediamines, butylenediamines, pentylenediamines, hexylenediamines, octylenediamines, nonylenediamines, decylenediamines, dimethylurea, 1,3-diamino-2-propanol, 3,3'-iminobispropylamine, guanidine and the like; aromatic polyamines, such as meta-, ortho-, and para-phenylenediamines, 1,4-naphthalenediamine, 1,4-anthradiamine, 3,3'-biphenyldiamine, 3,4-biphenyldiamine, 3,4-toluenediamine, meta-xylylenediamine, alpha, alpha'-bi-paratoluidine, para, para'-methylenedianiline, 1-methoxy-6-methyl-meta-phenylenediamine, para, para'-sulfonyldianiline and the like; and heterocyclic polyamines, such as piperazine, 2,5-dimethylpiperazine, melamine, 2,4-diamino-5-(aminomethyl) pyrimidine, 2,4,6-triaminopyrimidine, 3,9-bis(aminoethyl) spirobi-meta-dioxane, the polyalkylene polyamines, in particular, the polyethylene polyamines and polypropylene polyamines, such as diethylenetriamine, triethylenetetramine, tetraethylenepentamine, dipropylenetriamine, and the like.

Other polyfunctional amines include the low molecular weight polyamides which are condensation products of polycarboxylic acids, in particular, hydrocarbon dicarboxylic acids, with polyamines, particularly, diamines, such as those monomeric diamines previously listed. Typical polyamides can be prepared in accordance with known condensation procedures from adipic acid and hexamethylenediamine, dilinoleic acid and ethylenediamine, terephthalic acid and diethylenetriamine and the like.

Still other illustrations of polyfunctional amines are the addition products of polyamines, in particular diamines, and triamines, and low molecular weight epoxides containing oxirane oxygen linked to vicinal carbon atoms, such as, ethylene oxide, propylene oxide, butadiene dioxide, diglycidyl ether, epoxidized soybean oil, epoxidized safflower oil, and the like, and polyglycidyl polyethers, such as those prepared from polyhydric phenols and epichlorhydrin. Particularly useful polyfunctional amines are the monohydroxylalkyl polyalkylene polyamines which can be prepared by the addition reaction of polyalkylene polyamines, preferably, ethylenediamine, propylenediamine, diethylenetriamine, dipropylenetriamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine, N-hydroxypropyldiethylenetriamine, N-hydroxyethylpropylenediamine, N - hydroxypropylpropylenediamine, N-hydroxyethyldipropylenetriamine, and the like. Other polymunctional amines can be prepared with known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols, such as for example, the homologues of dihydroxydiphenylmethanes singularly or mixed and the dihydroxydiphenyldimethylmethanes singularly or mixed. Mixtures of diglycidyl diethers of dihydric phenols can be prepared by reacting epichlorhydrin with a dihydric phenol using a molar excess of epichlorhydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylenetriamine, and the like, bringing to an elevated temperature, for example, up to about 100° C. and maintaining at such an elevated temperature for times up to 4 to 5 hours. Alternatively, as an illustration, polyfunctional amines can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylene polyamine such as those listed above, and a vinyl group-containing compound. Typical vinyl group-containing compounds are ethylene, propylene, 1-butene, isobutene, acrolein, vinyl chloride, vinyl acetate, acrylonitrile, styrene and the like. These polyfunctional amines can be prepared in accordance with known procedures by reacting a polyamine and a vinyl group-containing compound in various proportions at a temperature in the range from 20° C. to 100° C. and removing unreacted materials and low boiling materials by vacuum distillation.

Other polyfunctional amines having a total of at least two active amino hydrogen atoms to the molecule can be advantageously employed in the epoxide compositions of this invention. For example, such polyfunctional amines as mixtures of para, para'-methylenedianiline and meta-phenylenedianiline, or other mixtures of two or more polyfunctional amines can be used. Particularly valuable compositions made in accordance with this invention are obtainable from such polyfunctional amines as described above which have melting points or melting point ranges below about 150° C. and contain at least two amino nitrogens to each of which at least one amino hydrogen is attached.

Acid catalysts which can be employed in our curable compositions to increase the curing rate are the metal halide Lewis acids, e.g., boron trifluoride, stannic chloride, ferric chloride, or metal halide Lewis acid-amine complexes, as for example, piperidine-boron trifluoride complex and monoethylamine-boro trifluoride complex. Uniform dispersions of catalyst in our curable compositions prior to curing have been found to be desirable in order to minimize local curing around catalyst particles. Agitation of the curable composition as the catalyst is added is sufficient when the catalyst is miscible with the composition. When the two are immiscible, the catalyst can be added in a solvent. Typical solvents for the acid catalysts include organic ether, e.g., diethyl ether, dipropyl ether, organic esters, e.g., methyl acetate, ethyl propionate, organic ketones, e.g., acetone, cyclohexanone, organic alcohols, e.g., methanol, propylene glycol, and the like.

Our curable compositions may contain small amounts of epoxides and diepoxides other than 3,4-epoxycyclohexylmethyl 3,4-epoxycyclohexanecarboxylates for developing special properties in our resins. In addition, other active hydrogen containing compounds, such as phenols and alcohols, or polycarboxylic anhydrides, can be incorporated into our curable compositions to provide special effects.

The following illustrative examples are presented. Wherever appearing in these examples, heat distortion values were obtained at 264 pounds per square inch of stress in accordance with ASTM test method D-648-45T. Barcol hardness values presented in the examples were determined through the use of a Barcol Impressor GYZJ 934-1 at a temperature of 25° C. unless otherwise indicated. Izod impact values as presented in the examples were obtained in accordance with ASTM test method, D-256-47T at a temperature of 25° C. unless otherwise indicated.

EXAMPLE 1

Two hundred and forty pounds of epichlorhydrin, 64 pounds of ethyl alcohol and 100 pounds of 4,4'-dihydroxydiphenyldimethylmethane, hereinafter referred to as bisphenol A, were charged to a stainless steel still equipped with a high speed agitator and reflux condenser and the mixture was heated to 60° C. at 325 to 350 millimeters of mercury, absolute pressure. Eighty-two pounds of 50 weight percent aqueous NaOH were then gradually added, with vigorous agitation, over a 3.5 hour period at such a rate that the reaction mass temperature remained below about 65° C. The reaction mass was stirred an additional 0.5 hour. Then the alcohol and unreacted epichlorhydrin were removed by vacuum distillation at 50 millimeters of mercury pressure to a pot temperature of 70° C. followed by vacuum steam distillation for 15 minutes at 70° C. to 80° C. at 50 millimeters of mercury pressure leaving a viscous residue. The residue was then dissolved in toluene and the toluene solution washed with successive portions of water at 45° C. to 55° C. until the wash water was substantially neutral. The washed residue then was heated at an absolute pressure of 75 millimeters of mercury to a temperature of 135° C. to remove any residual toluene and vacuum steam distilled for 15 minutes at an absolute pressure of 50 millimeters of mercury and a temperature of 140° C. It was then vacuum dehydrated at an absolute pressure of 50 millimeters of mercury and a temperature of 140° C., cooled and discharged. The polyglycidyl polyether of bisphenol A prepared in this manner had a specific gravity of 1.16 grams per cubic centimeter at 25° C., a viscosity as determined in a Brookfield viscometer of 15,000 centipoises at 25° C. and an epoxy equivalent of 190 grams of the polyglycidyl polyether per mole of epoxy group.

EXAMPLE 2

Four hundred and seventy-five grams (1.25 moles) of a polyglycidyl polyether of bisphenol A, such as that produced in Example 1, were added slowly and with vigorous agitation to 515 grams (5 moles) of diethylenetriamine. The addition rate was adjusted and cooling applied as needed to keep the reaction mass below a temperature of about 75° C. The adduct produced in this manner had a viscosity of 9,000 centipoises at 25° C., a specific gravity of 1.07 at 25° C. and an amine equivalent of about 50 grams of adduct for each amino hydrogen atom contained by the adduct.

EXAMPLE 3

Five hundred and fifteen grams (5 moles) of diethylenetriamine and 515 grams of water were mixed in a 2-liter flask immersed in a cooling bath, the solution cooled to 17° C. and ethylene oxide was passed in through a sparger, with vigorous agitation, until 220 grams (5 moles) were absorbed. The addition, which required 3.5 hours, was performed at such a rate that the temperature of the reaction mixture did not rise above 25° C. The reaction mixture was then agitated one hour at room temperature and vacuum dehydrated. The unreacted diethylenetriamine and other low boiling components present were then removed by fractional distillation at 5 millimeters of mercury absolute pressure to a vapor temperature of 165° C. The non-volatile polyamine adduct so obtained had a refractive index at 25° C. with sodium light of 1.5021 and an amine equivalent of 39 grams of adduct for each amino hydrogen atom.

EXAMPLE 4

A mixture containing 17 grams of diethylenetriamine and 83 grams of 3,4-epoxy-6-methylcyclohexylmethyl 3,4-epoxy-6-methylcyclohexanecarboxylate was prepared. This mixture contained such amounts of polyamine and diepoxide as to provide 1.3 amino hydrogens for each epoxy group. The mixture was then heated at 120° C. for 3 hours and further cured for 6 hours at 160° C. An infusible resin having the following properties was obtained:

Izod impact _____ 0.5
Heat distortion point _____ ° C__ 104
Barcol hardness _____ 38

The procedure described above was repeated 4 times using, however, the following diepoxides in place of 3,4-epoxy-6-methylcyclohexylmethyl 3,4-epoxy-6-methylcyclohexanecarboxylate, respectively: 3,4-epoxycyclohexylmethyl 3,4-epoxy-cyclohexanecarboxylate, 3,4-epoxy-1-methylcyclohexylmethyl 3,4-epoxy-1-methylcyclohexanecarboxylate and 3,4-epoxy-2-methylcyclohexylmethyl 3,4-epoxy-2-methylcyclohexanecarboxylate. Infusible resins having properties similar to those given above were obtained.

EXAMPLES 5 THROUGH 13

Nine mixtures containing different amounts of diethylenetriamine and each containing 1.4 grams of 3,4-epoxy-6-methylcyclohexylmethyl 3,4-epoxy-6-methylcyclohexanecarboxylate as listed in Table I below were prepared. Each mixture contained such amounts of polyamine and diepoxide as provided the respective amino hydrogen to epoxy group ratios as listed in Table I. Each mixture was then maintained at a temperature of 130° C. for 10 hours. The mixtures of Examples 5 and 6 were maintained at 130° C. for an additional 28 hours. Resins having the properties correspondingly listed in Table I were obtained.

*Table I*

| Example Number | Polyamine (Grams) | Amino Hydrogen Epoxy Group | Resin Properties |
|---|---|---|---|
| 5 | 0.021 | 0.10 | Liquid. |
| 6 | 0.052 | 0.25 | Viscous Liquid. |
| 7 | 0.11 | 0.50 | Rigid, soft. |
| 8 | 0.21 | 1.00 | Hard, Infusible. |
| 9 | 0.37 | 1.50 | Do. |
| 10 | 0.42 | 2.00 | Do. |
| 11 | 0.63 | 3.00 | Do. |
| 12 | 0.84 | 4.00 | Rigid, soft. |
| 13 | 1.05 | 5.00 | Soft. |

EXAMPLE 14

A mixture containing 2.7 grams of para-phenylenediamine and 14.0 grams of 3,4-epoxy-6-methylcyclohexylmethyl 3,4-epoxy-6-methylcyclohexanecarboxylate was prepared. This mixture was heated until it became homogeneous, occuring at about 110° C. The mixture contained such amounts of polyamine and diepoxide as to provide one amino hydrogen for each epoxy group. The mixture was then cured at 130° C. for 10 hours. A gel was formed after 2 hours at this temperature. A hard, infusible resin was obtained.

The procedure of the preceding paragraph was repeated with meta-phenylenediamine substituted for para-phenylenediamine. A hard, infusible resin having a somewhat lower softening point than the resin obtained from the para-phenylenediamine-diepoxide mixture above was obtained.

EXAMPLE 15

A mixture containing 70 grams of 3,4-epoxy-6-methylcyclohexylmethyl 3,4-epoxy-6-methylcyclohexanecarboxylate and 30 grams of the polyamine adduct prepared in Example 2 was prepared. This mixture contained such amounts of polyamine and diepoxide as provided 1.2 amino hydrogen for each epoxy group. The mixture was heated at 120° C. for 3 hours and then further cured at 160° C. for 6 hours. An infusible, amber colored resin having the following properties was obtained:

Izod impact _____ 0.49
Heat distortion point _____ ° C__ 118
Barcol hardness _____ 38

EXAMPLE 16

A mixture containing 1.5 grams of ethylenediamine and 14 grams of 3,4-epoxy-6-methylcyclohexylmethyl 3,4-epoxy-6-methylcyclohexanecarboxylate was prepared. This mixture contained such amounts of polyamine and diepoxide as provided 1 amino hydrogen for each epoxy group. The mixture was heated at 130° C. for 5 hours. A gel was formed within the first 30 minutes of heating at 130° C. A hard, strong, infusible resin was obtained.

EXAMPLE 17

A mixture containing 2.9 grams of hexamethylenediamine and 14 grams of 3,4-epoxy-6-methylcyclohexylmethyl 3,4-epoxy-6-methylcyclohexanecarboxylate was prepared. The amounts of polyamine and diepoxide contained by this mixture were such as to provide 1 amino hydrogen for each epoxy group. The mixture was heated for 5 hours at 130° C. and a gel formed within the first 90 minutes of said time. A hard, strong, infusible resin was obtained.

EXAMPLE 18

A mixture containing 56 grams (0.2 mole) of 3,4-epoxy-6-methylcyclohexylmethyl 3,4-epoxy-6-methylcyclohexanecarboxylate and 206 grams (2.0 moles) of diethylenetriamine was prepared in a 500 milliliter round-bottomed flask. This mixture contained such amounts of polyamine and diepoxide as to provide 24 amino hydrogens for each epoxy group. The flask and contents were heated for one hour at 100° C. and excess diethylenetriamine was removed by stripping under vacuum. A viscous, amber colored polyamine adduct was obtained. A mixture containing 4 grams of this polyamine adduct and 6 grams of 3,4-epoxy-6-methylcyclohexylmethyl 3,4-epoxy-6-methylcyclohexanecarboxylate was prepared and contained such amounts of polyamine and diepoxide as provided 1.5 amino hydrogens for each epoxy group. The mixture was then heated for 16 hours at 110° C. A hard, strong, infusible resin was obtained.

EXAMPLE 19

A mixture of 200 grams of epoxidized soybean oil containing 6.48 weight percent of oxirane oxygen and 450 grams (4.4 moles) of diethylenetriamine was prepared. This mixture contained such amounts of polyamine and diepoxide as provided 26 amino hydrogens for each epoxy group. The mixture then was heated at 95° C. for 3 hours and excess diethylenetriamine was removed by stripping to 90° C. to 100° C. under pressure of about 1 millimeter of mercury, absolute. A viscous, amber colored polyamine adduct was obtained. A mixture of 40 grams of this polyamine adduct and 60 grams of 3,4-epoxy-6-methylcyclohexylmethyl 3,4-epoxy-6-methylcyclohexanecarboxylate was prepared. This mixture contained such amounts of polyamine and diepoxide as provided 1.2 amino hydrogen for each epoxy group. The mixture was then heated at 120° C. for 3 hours and then at 160° C. for 6 hours. An infusible resin having the following properties was obtained:

Izod impact _____ 0.4
Heat distortion point _____ ° C__ 69
Barcol hardness _____ 25

EXAMPLE 20

A mixture containing 20 grams of the polyamine adduct prepared in Example 3 and 80 grams of 3,4-epoxy-6- methylcyclohexylmethyl 3,4-epoxy-6-methylcyclohexanecarboxylate was prepared. The amounts of polyamine and diepoxide contained by this mixture were such as provided 1.1 amino hydrogen for each epoxy group. The mixture was heated at 120° C. for 3 hours and then heated at 160° C. for an additional 6 hours. A hard, infusible resin was obtained.

EXAMPLE 21

A mixture containing 24.5 grams of 3,4-epoxy-6-methylcyclohexylmethyl 3,4-epoxy-6-methylcyclohexanecarboxylate and 10.5 grams of the polyamine adduct prepared in Example 2 was prepared. This mixture contained such proportions of diepoxide and polyamine as provided 1.4 amino hydrogens for each epoxy group. The mixture was then heated to 120° C. and maintained thereat for 1.5 hours. A gel was formed in the first 58 minutes of heating at 120° C. The gel was then cured for 6 hours at 160° C. and there was obtained an infusible resin having a heat distortion point of 103° C., an Izod impact value of 0.2 ft. lb. per inch of notch and a Barcol hardness of 43.

EXAMPLES 22 THROUGH 25

Four mixtures were prepared, each containing 1.4 grams of 3,4-epoxy-6-methylcyclohexylmethyl 3,4-epoxy-6-methylcyclohexanecarboxylate and various proportions of aniline as correspondingly listed in Table II below. Each mixture contained such proportions of diepoxide and aniline as provided the ratios of amino hydrogens per epoxy group as correspondingly listed in Table II. Each mixture was heated to 120° C. and maintained thereat for the periods of time correspondingly listed in Table II under the heading of "Cure time." Resins having the properties listed in Table II were formed from each of the mixtures.

Table II

| Example Number | Weight of Aniline (grams) | Amino Hydrogens per Epoxy Group | Cure Time at 120° C. (hours) | Resin Properties |
|---|---|---|---|---|
| 22 | 0.23 | 0.5 | 13.25 | Brown, solid. |
| 23 | 0.48 | 1.0 | 13.25 | Amber, solid. |
| 24 | 0.69 | 1.5 | 6.0 | Yellow, hard. |
| 25 | 0.96 | 2.0 | 6.0 | Do. |

EXAMPLE 26

A mixture was prepared from 7.7 grams of 3,4-epoxy-6-methylcyclohexylmethyl 3,4-epoxy-6-methylcyclohexanecarboxylate and xylylenediamine in the amount of 2.3 grams was prepared. The mixture contained such amounts of diepoxide and polyamine as provided 1.25 amino hydrogens for each epoxy group. The mixture was heated to 120° C. and formed a gel after 5 hours of heating at this temperature. The gel was heated at 120° C. for an additional 5 hours and then heated at 160° C. for another 6 hours. A hard, infusible resin was obtained.

EXAMPLE 27

A mixture was prepared from 7.0 grams of 3,4-epoxy-6-methylcyclohexylmethyl 3,4-epoxy-6-methylcyclohexanecarboxylate and 3.0 grams of the polyamine adduct prepared in Example 2. The amounts of diepoxide and polyamine contained by the mixture were such as provided 1.2 amino hydrogens for each epoxy group. To this mixture 0.1 gram of boron trifluoridepiperidine complex was added. This amount of complex provided a concentration of 0.63 weight percent borontrifluoride based on the weight of diepoxide. The gel was raised to and maintained at 100° C. for 5.45 hours during the first 1.45 hours of which a gel was formed. The temperature of the gel was raised to 120° C. and maintained thereat for 2.5 hours and then raised to 160° C. for an additional 6 hours. A tough, infusible resin having a Barcol hardness of 42 was obtained. A similar mixture containing the same amounts of diepoxide and polyamine adduct but containing no boron trifluoridepiperidine complex or other catalyst required heating at 100° C. for 5.5 hours to form a gel. The resin formed therefrom, however, was similar in properties to the resin formed from the diepoxide polyamine mixture containing the boron trifluoride-piperidine complex.

EXAMPLE 28

A mixture was prepared from 26.25 grams of 3,4-epoxy-6-methylcyclohexylmethyl 3,4-epoxy-6-methylcyclohexanecarboxylate, 8.75 grams of the polyamine adduct prepared in Example 2 and 0.35 gram of boron trifluoride-piperidine complex. The mixture contained such amounts of diepoxide and polyamine adduct as provided 1.1 amino hydrogens for each epoxy group. The catalyst concentration contained by the mixture was 0.58 weight percent of borontrifluoride based on the weight of diepoxide. The mixture became homogeneous upon mixing at room temperature. The temperature of the mixture was raised to 100° C. and maintained thereat for 5 hours. A gel was formed after heating for 1.5 hours at 100° C. After the 5 hours of heating at 100° C. the temperature was raised to 120° C. for two hours and then raised again to 160° C. for 6 hours. A tough, infusible resin having a heat distortion of 118° C., an Izod impact value of 0.2 ft. lbs per inch of notch and a Barcol hardness of 44 was obtained.

What is claimed is:

1. A curable composition comprising 3,4-epoxycyclohexylmethyl 3,4-epoxycyclohexnaecarboxylate having at least one lower alkyl substituent on the cyclohexane ring thereof and a polyfunctional amine in such relative amounts as provide from 0.2 to 5.0 amino hydrogens for each epoxy group.

2. A curable composition comprising 3,4-epoxycyclohexylmethyl 3,4-epoxycyclohexanecarboxylate having at least one lower alkyl substituent on the cyclohexane ring thereof and a polyfunctional amine in such relative amounts as provide from 0.8 to 2.0 amino hydrogens for each epoxy group.

3. A curable composition as claimed in claim 1 wherein the number of lower alkyl substituents on a single cyclohexane ring does not exceed 5.

4. A curable composition as claimed in claim 2 wherein the number of lower alkyl substituents on a single cyclohexane ring does not exceed 5.

5. A curable composition comprising 3,4-epoxycyclohexylmethyl 3,4-epoxycyclohexanecarboxylate and a polyfunctional amine in such relative amounts as provide from 0.2 to 5.0 amino hydrogens for each epoxy group.

6. A curable composition comprising 3,4-epoxycyclohexylmethyl 3,4-epoxycyclohexanecarboxylate and a polyfunctional amine in such relative amounts as provide from 0.8 to 2.0 amino hydrogens for each epoxy group.

7. A curable composition comprising 3,4-epoxy-6-methylcyclohexylmethyl 3,4-epoxy-6-methylcyclohexanecarboxylate and a polyfunctional amine in such relative amounts as provide from 0.2 to 5.0 amino hydrogens for each epoxy group.

8. A curable composition comprising 3,4-epoxy-1-methylcyclohexylmethyl 3,4-epoxy-1-methylcyclohexanecarboxylate and a polyfunctional amine in such relative amounts as provide from 0.2 to 5.0 amino hydrogens for each epoxy group.

9. A curable composition comprising 3,4-epoxy-2-methylcyclohexylmethyl 3,4-epoxy-2-methylcyclohexanecarboxylate and a polyfunctional amine in such relative amounts as provide from 0.2 to 5.0 amino hydrogens for each epoxy group.

10. A curable composition comprising 3,4-epoxy-6-methylcyclohexylmethyl 3,4-epoxy-6-methylcyclohexanecarboxylate and a polyfunctional amine from the class of diethylenetriamine, ethylenediamine, hexamethylenediamine, and phenylenediamine in such relative amounts as provide from 0.2 to 5.0 amino hydrogens for each epoxy group.

11. Curable compositions of claim 7 wherein the polyfunctional amine is diethylenetriamine.

12. The resinous polymer obtained by heating the curable composition of claim 1.

13. The resinous polymer obtained by heating the curable composition of claim 2.

14. The resinous polymer obtained by heating the curable composition of claim 3.

15. The resinous polymer obtained by heating the curable composition of claim 4.

16. The resinous polymer obtained by heating the curable composition of claim 5.

17. The resinous polymer obtained by heating the curable composition of claim 6.

18. The resinous polymer obtained by heating the curable composition of claim 7.

19. The resinous polymer obtained by heating the curable composition of claim 8.

20. The resinous polymer obtained by heating the curable composition of claim 9.

21. The resinous polymer obtained by heating the curable composition of claim 10.

22. The resinous polymer obtained by heating the curable composition of claim 11.

References Cited in the file of this patent

UNITED STATES PATENTS

| | | |
|---|---|---|
| 2,136,928 | Schlack | Nov. 15, 1938 |
| 2,444,333 | Castan | June 29, 1948 |
| 2,585,115 | Greenlee | Feb. 12, 1953 |
| 2,716,123 | Frostick et al. | Aug. 23, 1955 |